United States Patent
Forehand et al.

(10) Patent No.: US 6,205,569 B1
(45) Date of Patent: Mar. 20, 2001

(54) ERROR RECOVERY USING ALTERNATE HEADERS IN A DISC DRIVE

(75) Inventors: Monty A. Forehand, Yukon; Paul W. Burnett; Donald B. Douglas, both of Oklahoma City, all of OK (US); Charles E. Skeldon, Clearwater, MN (US); Jimmie R. Shaver, Jr., Yukon, OK (US); William C. Little, Edmond, OK (US); Florence F. Kung, Yukon, OK (US); Krishna R. Malakapalli, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/976,208

(22) Filed: Nov. 18, 1997

(51) Int. Cl.[7] .................................................. G11C 29/00
(52) U.S. Cl. ......................... 714/763; 711/112; 711/162; 711/202; 711/209
(58) Field of Search ..................................... 714/752, 758, 714/763, 764, 768, 53; 360/53, 49, 70, 75, 109, 135; 365/200, 189.01; 711/112, 162, 202, 209, 77.08

(56) References Cited

U.S. PATENT DOCUMENTS

| | | |
|---|---|---|
| 5,047,876 | 9/1991 | Holsinger ................................ 360/46 |
| 5,136,439 | 8/1992 | Weispfenning et al. .......... 360/77.08 |
| 5,262,907 | 11/1993 | Duffy et al. ....................... 360/77.05 |
| 5,276,662 | 1/1994 | Shaver, Jr. et al. ................... 369/32 |
| 5,388,085 * | 2/1995 | Jaquette ................................. 369/32 |
| 5,434,719 * | 7/1995 | Miller et al. ............................ 360/53 |
| 5,440,716 * | 8/1995 | Schultz et al. ........................ 711/114 |
| 5,446,748 * | 8/1995 | Hasebe et al. ........................... 714/1 |
| 5,459,757 | 10/1995 | Minuhin et al. ...................... 375/376 |
| 5,471,478 * | 11/1995 | Mangan et al. ....................... 365/200 |
| 5,488,694 * | 1/1996 | McKee et al. ............................ 710/4 |
| 5,563,828 * | 10/1996 | Hasbun et al. ................... 365/185.33 |
| 5,592,340 | 1/1997 | Minuhin et al. ........................ 360/46 |
| 5,592,648 * | 1/1997 | Schultz et al. ........................ 711/114 |
| 5,600,662 * | 2/1997 | Zook .................................. 371/40.14 |
| 5,627,843 | 5/1997 | Deng et al. ........................... 714/785 |
| 5,631,999 | 5/1997 | Dinsmore ............................. 388/805 |
| 5,751,512 * | 5/1998 | Anderson ............................. 360/78.4 |
| 5,812,755 * | 9/1998 | Kool et al. ....................... 395/182.06 |
| 5,818,654 * | 10/1998 | Reddy et al. ........................... 360/53 |
| 5,854,778 * | 12/1998 | Shimizu et al. ........................ 369/59 |
| 6,025,971 * | 2/2000 | Inoue et al. ........................ 360/77.08 |

OTHER PUBLICATIONS

Boling, et al. (Improved hard disk seek time using fuzzy logic control; IEEE, Apr. 14, 1996).*

Finch and Moczarny, "Headerless disk formatting: Making room for more date," Data Storage Magazine, Apr. 1997, pp. 51,52, and 54, vol. 4, No. 5, Pennwell Publishing Co., Tulsa, Oklahoma.

* cited by examiner

*Primary Examiner*—Albert Decady
*Assistant Examiner*—Guy Lamarre
(74) *Attorney, Agent, or Firm*—Crowe & Dunlevy

(57) ABSTRACT

An apparatus and method are disclosed for recovering from a header error condition in a disc drive of the type having a rotatable disc having a plurality of concentric tracks with data fields for the storage and retrieval of data and header fields providing logical address information for the data fields. The header fields include read and write header fields which are used during read and write operations, respectively, to align read and write elements of the head with the data fields. When the disc drive unsuccessfully decodes the logical address information from a selected header field associated with a selected data block, an alternate header error recovery routine is performed wherein attempts are made to decode the logical address information from the alternate header field associated with the selected data block. Radial offsets can further be applied to the head to enhance the decoding of the logical address information from the alternate header field.

15 Claims, 4 Drawing Sheets

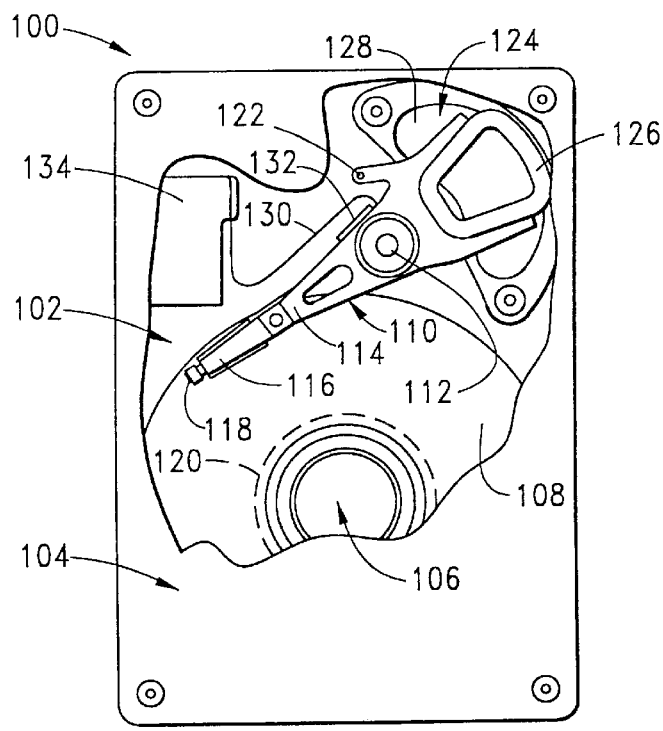
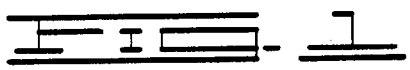
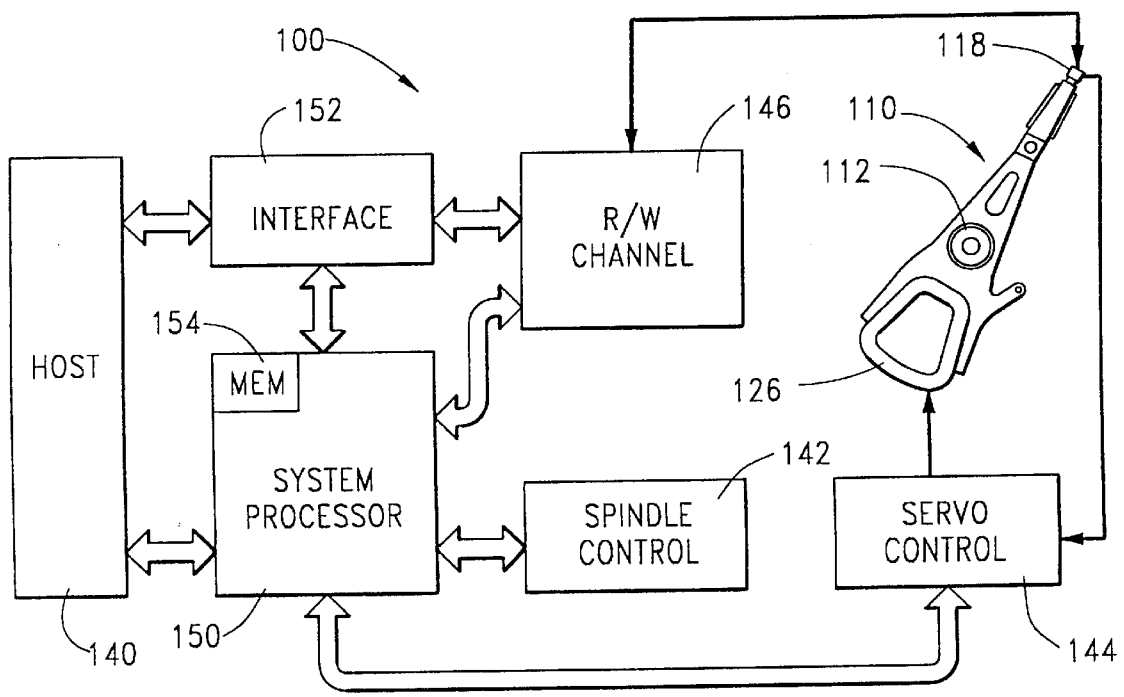

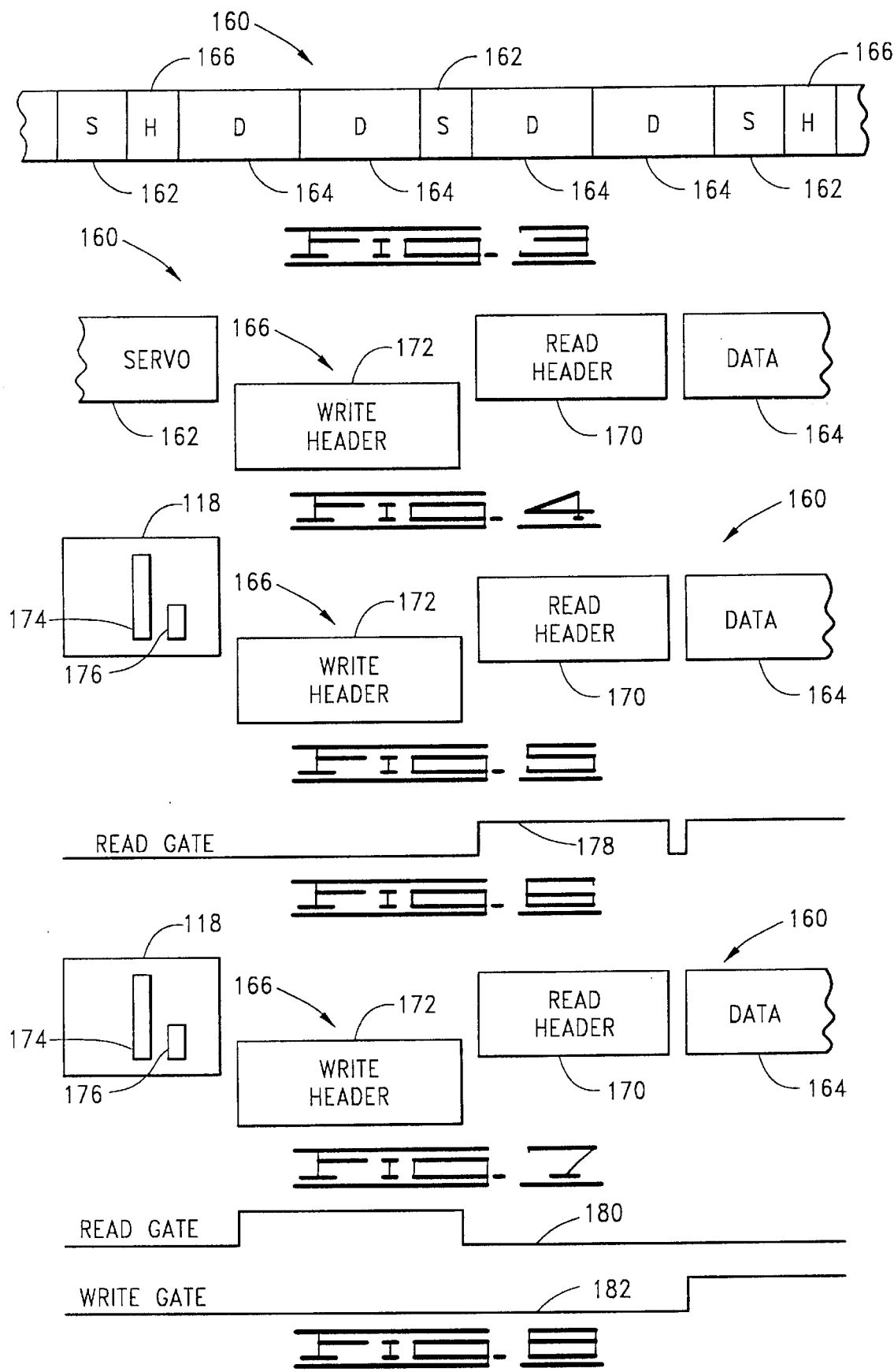

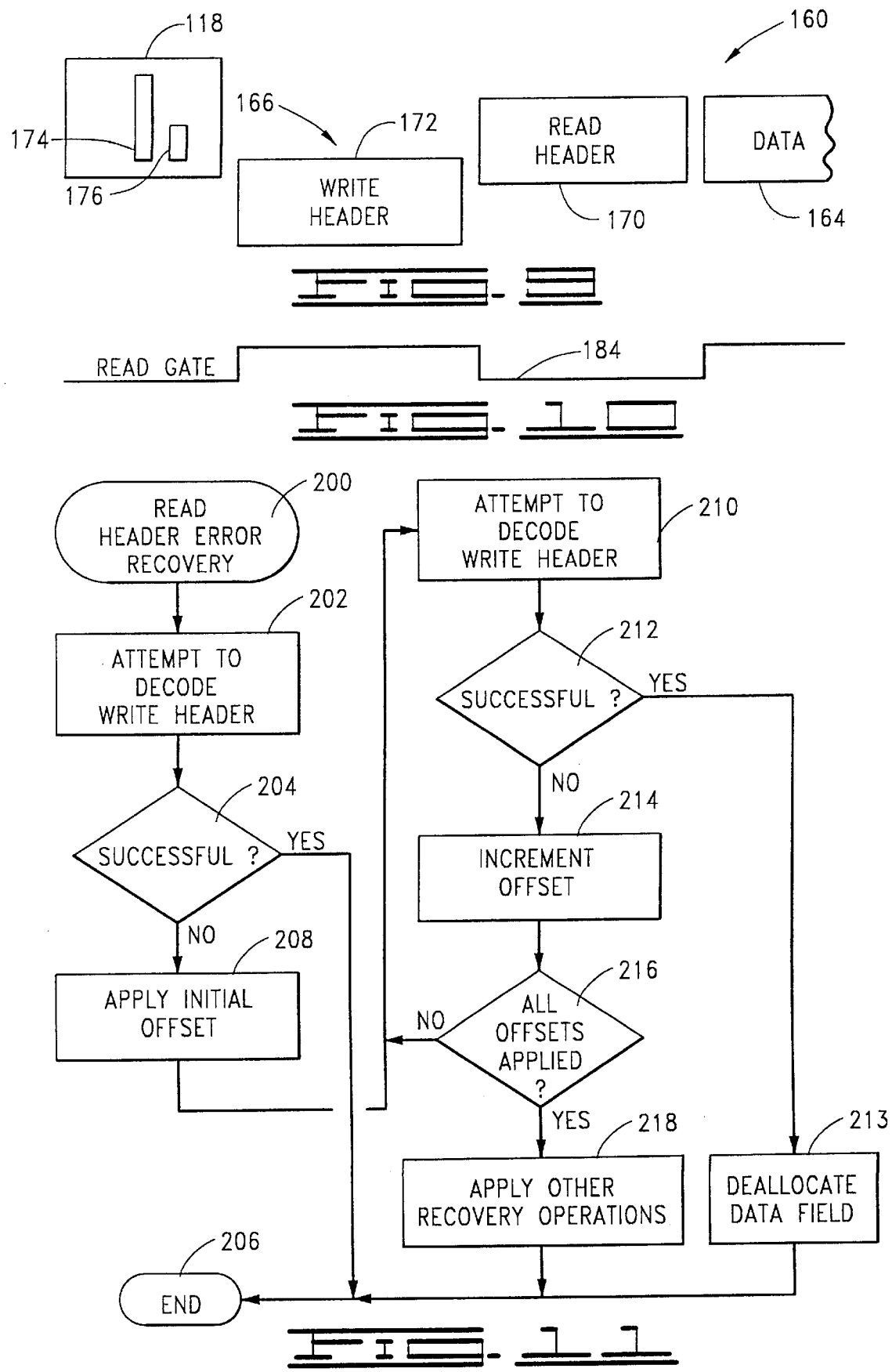

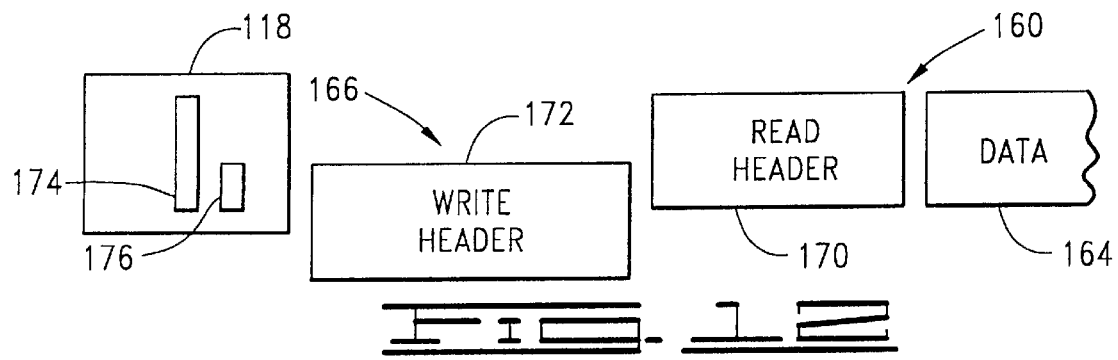
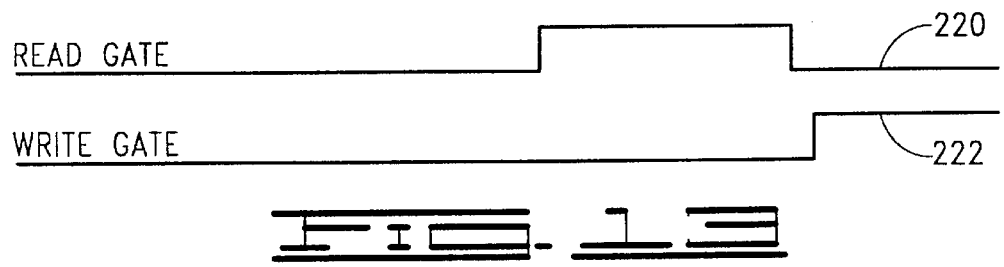
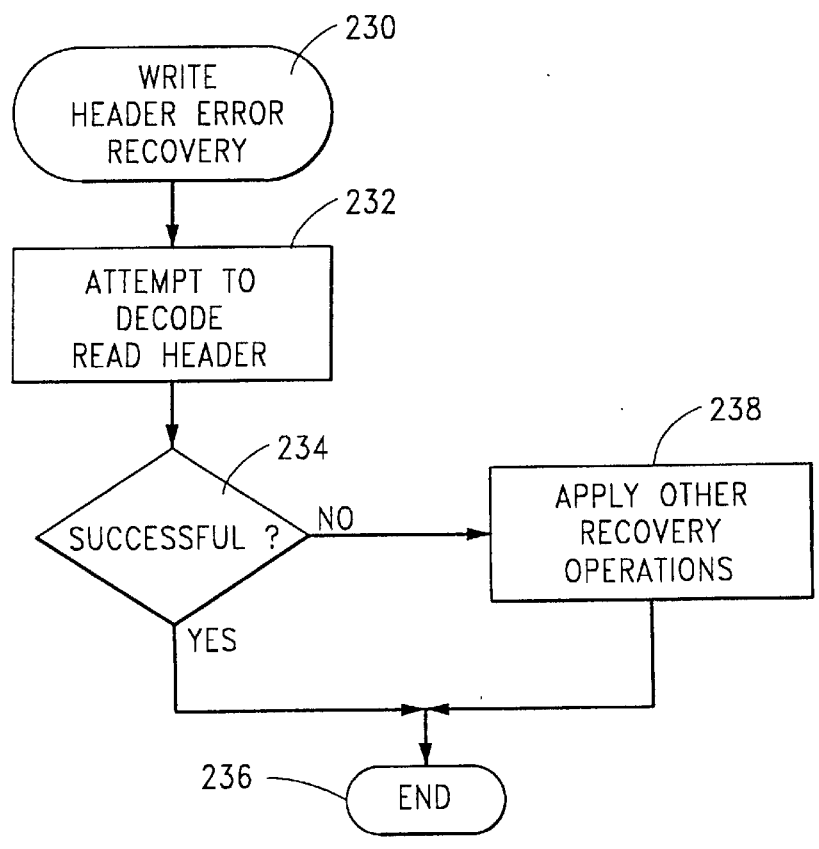

ERROR RECOVERY USING ALTERNATE HEADERS IN A DISC DRIVE

FIELD OF THE INVENTION

The present invention relates generally to the field of disc drive data storage devices and more particularly, but without limitation, to header error recovery during disc drive read and write operations.

BACKGROUND

Hard disc drives enable users of computer systems to store and retrieve vast amounts of data in a fast and efficient manner. A typical disc drive employs a stack of magnetizable discs which are rotated at a constant high speed and are provided with a plurality of nominally concentric tracks on each of the disc surfaces. Data are stored through the selective magnetization of the tracks by an array of read/write heads that are controllably positioned adjacent the tracks through the use of a closed loop digital servo system. To read previously stored data, a read/channel and disc drive interface reconstruct read signals generated as the heads detect the selective magnetization of the discs.

The tracks are defined by servo information written as a series of fields on the surfaces of the discs during disc drive manufacturing, with the fields radially aligned on the surfaces of the discs, the fields extending radially outwardly from the center of the disc in a manner similar to spokes of a wheel. User data and header fields are subsequently defined in the portions of the tracks between adjacent servo fields during a disc drive formatting operation. The user data fields (also commonly referred to as "sectors") are used to store the user data and the header fields (also commonly referred to as "headers") are used to provide the servo system with logical addressing and other information associated with the sectors, such as deallocation status.

To accommodate ever greater data storage capacities in successive generations of drives, advancements in the art have been continually implemented by disc drive manufacturers to increase data storage densities. One particularly effective advancement has been the implementation of magneto-resistive (MR) heads.

A typical MR head includes an inductive write element to write the data to a corresponding disc, with the inductive element comprising a coil wrapped about a magnetically permeable core having a write gap. Accordingly, the writing of data entails the passage of a time-varying write current through the coil which produces a magnetic field across the gap, the magnetic field selectively magnetizing the tracks.

A typical MR head further includes an MR element to subsequently read the data from the disc. The MR element comprises a material that undergoes a substantial change in electrical resistance when the element is subjected to a magnetic field of a particular orientation. Thus, the reading of data entails passing a bias current through the MR element and monitoring the voltage across the element while it is subjected to the magnetization pattern of a track.

It will be recognized that increases in data storage densities have further been achieved through the flying of the heads closer to the surfaces of the discs. However, disc drive flying heights have now been reduced to the point that the heads will occasionally contact the discs at high points on the disc (or the heads will contact contaminating particles disposed on the disc). Because of the sensitive nature of a typical MR head, such contact will usually lead to a sudden increase in temperature of the head, distorting the readback signal for several microseconds.

Such an anomalous condition is commonly referred to as a thermal asperity and will cause the readback signal to have a sudden increase in amplitude, followed by a long falling edge due to the relatively long heat dissipation time constant of the MR head. This distortion of the readback signal can impede the recovery of a significant amount of data from a track. However, the extent of such distortion is often minimized through the use of additional readback signal filtering in the read channel. Other types of anomalous conditions, such as localized media defects which prevent proper magnetization of portions of surfaces of the discs, can also detrimentally affect MR head performance; however, such can usually be minimized through the use of appropriate circuitry and compensation routines. Accordingly, MR heads have been successfully implemented into disc drives by disc drive manufacturers, but at a price of greater complexity in the construction and operation of the drives.

An example of the types of changes in operation required to utilize MR heads is the fact that the use of separate write and read elements in the same MR head generally necessitates a change in the relative positioning of the head during read and write operations. That is, as the center of the read element is usually physically offset from the center of the write element, the positioning of the head is slightly different during a read operation as compared to a write operation in order to center the respective elements over a selected track. The amount of this positional offset depends upon the construction of each particular head, as well as the radial position of the track with respect to the disc.

As a result of this positional offset, the headers used to provide addressing and other information for the associated sectors on each track are also usually offset by a corresponding amount. The headers are usually provided in pairs, with each pair comprising a write header and a read header which are read during write and read operations, respectively, on the associated sectors.

Serious operational problems thus arise when a thermal asperity (or other anomalous condition) prevents the disc drive from properly decoding the header information during a read or write operation. More particularly, as the headers serve to identify the address and status of one or more sectors, the inability to decode the header information prevents access to the sectors, which can unhappily prevent the retrieval of previously stored user data from the drive. It is to the alleviation of such header error conditions and to the facilitation of continued advancements in disc drive data storage capacities that the present invention is directed.

SUMMARY OF THE INVENTION

The present invention provides a method and apparatus for recovering from a header read error condition in a disc drive.

In accordance with the preferred embodiment, the disc drive comprises a rotatable disc on which a plurality of nominally concentric tracks are defined, with each of the tracks including data fields for the storage and retrieval of data and header fields providing logical address information for the data fields. The header fields include read and write headers which are used during read and write operations, respectively, to align read and write elements of a head with the data fields.

When the disc drive unsuccessfully decodes the logical address information for a selected data track in the associated read header during a read operation upon the data track, a read header error recovery routine is performed in which the disc drive attempts to decode the logical address information from the associated write header. Offsets as a percentage of the total read-write offset are preferably applied to enhance the ability of the disc drive to decode the logical address information.

Similarly, when the disc drive unsuccessfully decodes the logical address information for a selected data track in the associated write header during a write operation upon the data track, a write header error recovery routine is performed in which attempts are made to decode the logical address information from the associated read header. Unlike the read header error recovery routine, however, offsets are not applied to the head during the write header error recovery routine of the preferred embodiment in order to minimize the possibility of inadvertently overwriting data on adjacent tracks.

These and various other features as well as advantages which characterize the present invention will be apparent from a reading of the following detailed description and a review of the associated drawings.

BRIEF DESCRIPTION OF THE DRAWINGS

FIG. 1 provides a top plan view of a disc drive constructed in accordance with a preferred embodiment of the present invention.

FIG. 2 provides a functional block diagram of the disc drive of FIG. 1 operably connected to a host computer in which the disc drive is mounted.

FIG. 3 illustrates a portion of one of the tracks defined on the disc of FIG. 1, showing the relative arrangement of servo, data and header fields.

FIG. 4 shows a portion of the track of FIG. 3 in greater detail, showing each of the header fields of FIG. 3 to in turn comprise a read header field and a write header field, with an offset applied to the write header field with respect to the read header field to account for the construction of the disc drive.

FIG. 5 shows the read and write header fields of FIG. 4 in conjunction with the head of FIG. 1, which in FIG. 5 is shown to include read and write elements for the reading and writing of data, respectively; accordingly, FIG. 5 shows the alignment of the head relative to the track during a normal disc drive read operation.

FIG. 6 provides a read gate signal generated by the interface circuit of FIG. 2, with the head of FIG. 5 being operable at times when the read gate signal is high.

FIG. 7 shows the read and write header fields of FIG. 4 in conjunction with the head of FIG. 1, illustrating the corresponding alignment of the head during a normal disc drive write operation.

FIG. 8 provides a read gate and a write gate signal, with the read element of FIG. 7 reading the write header of FIG. 7 when the read gate signal is high and the write element of FIG. 7 writing data to the data field of FIG. 7 when the write gate signal is high.

FIG. 9 illustrates the relative alignment of the head during a read header error recovery routine in accordance with the present invention.

FIG. 10 shows the corresponding read gate signal which enables the reading of the write header and data field of FIG. 9.

FIG. 11 provides a generalized flow chart for the read header error recovery routine and is representative of programming used by the system processor of FIG. 2.

FIG. 12 illustrates the relative alignment of the head during a write header error recovery routine in accordance with the present invention.

FIG. 13 shows the corresponding read and write gate signals which enable the reading of the read header and the writing of data to the data field of FIG. 12.

FIG. 14 provides a generalized flow chart for the read header error recovery routine and is representative of programming used by the system processor of FIG. 2.

DETAILED DESCRIPTION

Turning now to the drawings and more particularly to FIG. 1, shown therein is a top plan view of a disc drive 100 constructed in accordance with a preferred embodiment of the present invention. The disc drive 100 includes a base deck 102 to which various disc drive components are mounted and a top cover 104, which is shown in a partial cut-away fashion to expose selected components of interest. The base deck 102 cooperates with the top cover 104 to provide an internal, sealed environment for the disc drive 100 in a conventional manner.

Mounted to the base deck 102 is a spindle motor (shown generally at 106) to which a plurality of discs 108 are mounted for rotation at a constant high speed. Adjacent the discs 108 is an actuator assembly 110 which pivots about a cartridge bearing assembly 112 in a rotary fashion. The actuator assembly 110 includes actuator arms 114 which support flexures 116. The flexures 116 in turn support heads 118, with each of the heads 118 corresponding to a surface of one of the discs 108. As provided hereinabove, the heads 118 are positionably located over data tracks (not shown) of the discs 108 in order to read data from and write data to the tracks. At such time that the disc drive 100 is not in use, the heads 118 are moved to landing zones (denoted at broken line 120), which are located in FIG. 1 near the inner diameter of the discs 108. A latching arrangement (a pin of which is shown at 122) is used to secure the actuator assembly 110 when the heads 118 are moved to the landing zones 120.

Continuing with FIG. 1, the actuator assembly 110 is controllably positioned by way of a voice coil motor (VCM, shown generally at 124) comprising an actuator coil 126 immersed in the magnetic field generated by at least one permanent magnet 128. When current is passed through the actuator coil 126, an electromagnetic field is set up which interacts with permanent magnet 128, causing the actuator assembly 110 to pivot about the cartridge bearing assembly 112 and the heads 118 to move across the surfaces of the discs.

To provide the requisite electrical conduction paths between the heads 118 and disc drive read/write circuitry (not shown in FIG. 1), head wires (not separately shown) are routed on the actuator assembly 110 from the heads 118, along the flexures 116 and the actuator arms 114 to a flex circuit assembly 130. Particularly, the head wires are secured to corresponding pads of a flex circuit board 132 which is connected to a flex 134 which terminates at a flex circuit bracket 136. The flex circuit assembly 130 facilitates communication between the actuator assembly 110 and a disc drive printed circuit board (not shown) mounted to the underside of the disc drive 100.

FIG. 2 provides a general functional block diagram of the disc drive 100 of FIG. 1, operably connected to a host computer 140. As shown in FIG. 2, the disc drive 100 generally comprises a spindle control circuit 142, a servo control circuit 144 and a read/write channel 146, all of which are in communication with and controlled by a system processor 150. An interface circuit 152 is shown connected to the read/write channel 146 and to the system processor 150, with the interface circuit 152 serving as a data interface and buffer for the disc drive. The interface circuit 152 includes a sequencer (not separately shown) which comprises hardware used to establish varying timing sequences during the operation of the read/write channel 146. Memory (MEM) 154 in the form of random access memory (RAM), read-only memory (ROM) and the like are provided to store programming utilized by the system processor 150.

As will be recognized, the spindle control circuit 142 controls the rotational speed of the spindle motor 106 (FIG. 1) in a conventional manner. Typical spindle control circuits are discussed in U.S. Pat. No. 5,631,999 issued May 20, 1997 to Dinsmore, assigned to the assignee of the present invention.

The servo control circuit 144 of FIG. 2 is shown to receive servo information from the head 118 and, in response thereto, provides a correction signal to the actuator coil 126 in order to position the head 118 with respect to the disc 108 (FIG. 1). Additional discussion regarding typical digital servo systems is provided in U.S. Pat. No. 5,262,907 issued Nov. 16, 1993 to Duffy et al., assigned to the assignee of the present invention.

The read/write channel 146 operates to write data to the disc 108 in response to user data provided to the channel from the interface circuit 152 by encoding and serializing the data and generating a write current utilized by the head 118 to selectively magnetize portions of a selected track on the disc 108. Correspondingly, the previously stored data is retrieved by the read/write channel 146 by reconstructing the data from the read signals generated by the head 118 as the head passes over the selected track on the disc 108. The construction and operation of typical read/write channels are discussed in U.S. Pat. No. 5,047,876 issued Sep. 10, 1991 to Holsinger, U.S. Pat. No. 5,459,757 issued Oct. 17, 1995 to Minuhin et al. and U.S. Pat. No. 5,592,340 issued Jan. 7, 1997 to Minuhin et al., all of which are assigned to the assignee of the present invention.

Referring now to FIG. 3, shown therein is a generalized representation of a portion of a track 160 of the disc drive 100, illustrating the relative placement of servo fields (S) 162, data fields (D) 164 and header fields (H) 166. The servo fields 162 are embedded on each track and provide the servo information used by the servo control circuit 144 to maintain the position of the corresponding head 118 (not shown in FIG. 3) over the track 160. As will be recognized, in an alternative scheme a particular surface of one of the discs 108 can be selected as a dedicated servo surface containing all of the servo fields 162, so that the position of the remaining heads is maintained through the control of the servo head adjacent the dedicated servo surface.

The data fields 164 (also commonly referred to as "sectors") are provided for the storage of user data. Associated with each pair of successive servo fields 162 is a header field 166, which is used to provide logical address and status information for associated data fields 164 following the header field 166. This arrangement of one header field 166 for each pair of servo fields 162 is commonly referred to as a "header fewer format"; it will be recognized, however, that the present invention can readily be practiced using other formats, such as the use of a header field 166 after each servo field 162, or a header field 166 after a greater number of successive servo fields 162.

FIG. 4 illustrates a portion of the track 160 in greater detail and shows each header field 166 to in turn comprise a read header 170 and a write header 172 which are used during read and write operations, respectively, on the associated data fields 164. The read and write headers 170, 172 are typically radially offset as shown to account for slight differences in location within the head 118 (FIG. 1) between write and read elements of the associated head 118 (these elements are not shown in FIG. 4). The amount of offset will also depend upon the radial position of the track 160 and the placement of the actuator assembly 110 with respect to the discs 108 within the disc drive 100. Usually, however, the read header 170 will be substantially aligned with the data fields 164 and the write header 172 will be offset by a selected radial distance from the data fields 164. Although the particular arrangement of information within the header fields 166 will vary depending upon the construction of each drive, the informational content of each set of read and write headers 170, 172 is typically identical.

Referring now to FIG. 5, shown therein is a general representation of the radial alignment of the associated head 118 with respect to the track 160 during a normal read operation of the disc drive 100. An inductive write element 174 and an MR read element 176 are disposed within the head 118 as shown. During the read operation, the head 118 is positioned so that the center of the MR read element 176 is nominally aligned with the read header 170 so as to facilitate the subsequent reading of the data field 164. FIG. 6 illustrates a read gate signal 178 generated by the sequencer of the interface circuit 152 (FIG. 2) during the read operation, the read/write channel 146 being operable to read from the disc 108 when the read gate signal 178 is high. Thus, the read element 176 reads the header information from the read header 170 and, when this information indicates that the desired data fields 164 have been located, the read element 176 proceeds to read the user data fields 164 and the read/write channel 146 (FIG. 2) transfers the user data stored therein to the host computer 140.

FIG. 7 shows a general representation of the corresponding radial alignment of the head 118 during a normal write operation of the disc drive 100. As shown in FIG. 7, the head 118 is positioned so that the read element 176 is centered on the write header 174, aligning the write element 174 over the data field 164. FIG. 8 shows corresponding read and write gate signals 180, 182 generated by the sequencer, so that the write header 172 is read when the read gate signal 180 is high and data are written to the data field 164 when the write gate signal 182 is high. Thus, the read element 176 reads the header information from the write header 172 and, when the information indicates that the target data fields 164 have been located, the write element 174 proceeds to write the user data to the data fields 164.

As will be recognized, during both read and write operations the servo control circuit 144 operates to align the associated head 118 over the target track 160 containing the target data fields 164. The necessary offset is applied in order to radially align the read element 176 of the head 118 with the appropriate header (170 or 172), depending upon whether a read or write operation is to be performed. The head 118 then proceeds to search for the appropriate header (170 or 172) that identifies the target data fields 164 as the disc 108 rotates under the head 118.

It will thus be appreciated that a failure to properly decode the header information of the read or write header 170, 172 will prevent the disc drive 100 from successfully completing the read or write operation upon the target data field 164. Although actions can be taken during an error recovery routine to recover the header information utilizing techniques such as adaptive filtering, changes in error correction code (ECC) level processing and the like, an anomalous condition such as a thermal asperity which prevents the disc drive 100 from properly discerning the location of the target data field 164 can often prevent access to that field. Such a condition is particularly egregious when user data have been previously stored to the target data field 164, in that the disc drive 100 may be wholly unable to retrieve this user data.

Accordingly, the disc drive 100 is provided with enhanced capability to recover from errors associated with the decoding of the header information stored in the read and write headers 170, 172. More particularly, as discussed in greater detail below the disc drive 100 operates to utilize the alternate header field in order to gain access to the target data field 164.

Referring to FIGS. 9 and 10, the operation of the disc drive 100 will first be described with respect to a header error that is encountered during a read operation. Generally, at such time that an anomalous condition is present that prevents proper decoding of the header information from a particular read header (such as the read header 170 of FIG. 9), the read element 176 attempts to read the associated write header 172, as indicated by read gate signal 184 of FIG. 10. Initially, the head 118 is maintained at a position nominally over the center of the track 160 in an attempt to recover the header information from the write header 172; if unsuccessful, a series of offsets are sequentially provided to the head in order to bring the read element 176 closer to the write header 172 to enhance the ability to recover the header information from the write header 172.

FIG. 11 provides a generalized flow chart illustrating the steps performed during a READ HEADER ERROR RECOVERY routine 200, which is representative of programming stored in MEM 154 (FIG. 2) and utilized by the system processor 150.

As shown by block 202, at such time that the disc drive 100 is unable to recover the header information from the read header 170 associated with the target data field 164, the disc drive 100 first attempts to recover the header information from the write header 172 (FIG. 9) with the head remaining positioned nominally over the center of the track 160. Depending upon the relative size and location of the write and read elements 174, 176 within the head, as well as the radial position of the track 160, the read element 176 may be able to properly decode the write header 172 without necessitating a change in the relative position of the head 118. The operation of block 202 includes a preselected maximum number of sequential recovery attempts with the head 118 in this initial position, with the routine terminating at such time that the header and data field information are successfully recovered.

When the operation of block 202 is successful, the routine passes from decision block 204 and ends at block 206, after which the disc drive 100 resumes normal operation. However, when the operation of block 202 is unsuccessful in recovering the header information from the write header 172, the routine continues to block 208 wherein an initial positional offset is applied to the head 118. Although the amount of this initial offset can vary depending upon the application, in a preferred embodiment the initial offset is set equal to 25% of the total positional offset that the head 118 normally undergoes between a read and a write operation on the selected track 160. Hence, the operation of block 208 causes the head 118 to be positioned away from the center of the track 160 by an amount substantially equal to 25% of the total read-write offset for the head 118 at the track 160.

Once the initial offset is applied, the routine continues to block 210, where the read element 176 again attempts to decode the write header 172 and the data field 164 over a number of rotations of the disc 108 (up to a preselected maximum number of rotations). When successful, the routine passes from decision block 212 to block 213, wherein the target data field 164 is deallocated from further use, after which the routine ends at block 206. However, should the initial offset be insufficient to enable proper decoding of the write header 172, the amount of offset is increased by a selected increment, as shown by block 214. Preferably, each increment applied by the operation of block 214 is equal to 25% of the read-write offset, so that the head is sequentially moved to positions of 25%, 50%, 75% and 100% of the read-write offset during subsequent passes through the routine.

After the application of each offset increment by block 214, decision block 216 determines whether all of the offset positions have been applied; if not, the routine returns as shown back to block 210. However, at such time that all of the offset positions have been applied without success, the routine passes from decision block 216 to block 218 wherein other recovery operations are applied in an attempt to decode the data from the target data field 164. These other recovery operations are conventional recovery operations such as adjustments in various circuit parameters likely to enhance the decoding of the read header 170 and the recovery of the data stored in the target data field 164.

Table I. summarizes various settings used during the READ HEADER ERROR RECOVERY routine of FIG. 11 in accordance with the preferred embodiment.

TABLE 1

Read Header Error Recovery Table

| STEP | ATTEMPTS | HEADER ECC | DATA ECC | OFFSET (%) |
|---|---|---|---|---|
| 1 | 5 | OFF | T = 2 | 0 |
| 2 | 3 | OFF | T = 2 | 25 |
| 3 | 2 | OFF | T = 2 | 50 |
| 4 | 1 | OFF | T = 1 | 75 |
| 5 | 1 | ON | T = 1 | 100 |

As shown by Table I., the READ HEADER RECOVERY routine is characterized as a series of five steps with applied offsets of 0%, 25%, 50%, 75% and 100% of the total read-write offset, respectively. The number of attempts performed for each step is also shown, with five attempts being performed during Step 1, three attempts during Step 2, two attempts during Step 3, and one attempt each for Steps 4 and 5. As will be recognized, Step 1 corresponds to the operation of block 202 of FIG. 11 and each of the Steps 2 through 5 correspond to the operation of block 210 of FIG. 11, with the offset being incremented at the end of each step by the operation of block 214 as described above.

The number of attempts is preferably determined based upon empirical data obtained from the evaluation of one or more nominally identical drives in which intermittent read header errors are present. For reference, in one particular type of disc drive it was found that over 90% of the read header errors were successfully resolved during Step 1 (i.e., no offset applied to the head 118) and that most of the remaining errors were successfully resolved during Step 2 (i.e., an offset of 25% being applied to the head 118). The number of attempts at each offset in any particular application should be selected so as to maximize the ability of a drive to recover from the read header error; however, consideration should be given to limiting the total number of attempts so as to not unduly extend the time required to perform the routine.

Table I. also includes columns identified as "Header ECC" and "Data ECC", which will be recognized by those skilled in the art to correspond to the use of error correction code (ECC) circuitry of the read/write channel 146 during the reading of the write header 172 and the data field 164, respectively. ECC is a data encoding methodology that enables input data to be mapped into a mathematical field (such as a Galois field using Reed-Solomon encoding) through the appending of code symbols to each defined, sequential set of data symbols as the data symbols are stored. Thus, up to a selected number of erroneous data symbols can be detected and corrected by the ECC circuitry when the data and code symbols are subsequently retrieved. The ECC circuitry can be selectively disabled and different levels of ECC decoding can be selectively applied, with each level having a different risk of misdetecting and miscorrecting otherwise correct data symbols.

Preferably, ECC is disabled during the reading of the write header 172 during all of the steps except Step 5, as indicated by Table I. Moreover, in the preferred embodiment two different levels "T" of ECC are contemplated, with T=1 used during normal operation and T=2 which provides enhanced recovery capabilities, but with a greater chance of miscorrection. Hence, Steps 1 and 2 use enhanced ECC recovery level T=2 and Steps 3 through 5 use the normal ECC recovery level T=1. Other changes in the parametric configuration of the disc drive 100 could readily be performed during the execution of the routine of FIG. 11, depending upon the application.

Having concluded a discussion of the recovery of read header errors encountered during a read operation, reference is now made to FIGS. 12 and 13, which generally illustrate the operation of the disc drive 100 in response to the occurrence of a write header error during a write operation. It will be understood that write header error recovery is generally similar to the read header error recovery methodology discussed above, except that offsets are not applied to the position of the head 118 in order to prevent the inadvertent overwriting of data on adjacent tracks.

Generally, when an anomalous condition prevents the proper decoding of the header information associated with the write header 172, the read element 174 attempts to recover the information from the read header, as indicated by read gate signal 220, before writing the data to the data field 164, as indicated by write gate signal 222.

FIG. 14 provides a generalized flow chart for a WRITE HEADER ERROR RECOVERY routine 230 illustrating the steps performed by the disc drive 100 to recover from a write header error condition. The routine is representative of programming stored in MEM 154 (FIG. 2) and used by the system processor 150.

As shown by block 232, the disc drive 100 attempts to decode the read header 170 over a preselected maximum number of rotations of the disc 108. The head 118 is positioned as shown in FIG. 12 so that the write element 174 is substantially aligned with the data field 164, as during a normal write operation. A selected number of recovery attempts are performed during the operation of block 232 which, if successful, results in the exiting of the routine by way of decision block 234 and end block 236. However, when the operation of block 232 is unsuccessful, the routine passes from decision block 234 to block 238 wherein other conventional recovery operations are applied in an attempt to recover from the write header error condition.

Table II. summarizes preferred settings used during the WRITE HEADER ERROR RECOVERY routine of FIG. 14.

TABLE II

Write Header Error Recovery Table

| STEP | ATTEMPTS | HEADER ECC | DATA ECC | OFFSET (%) |
|---|---|---|---|---|
| 1 | 12 | OFF | N/A | 100 |

In Table II. only one step (Step 1) is shown which corresponds to the operation of block 232 of FIG. 14, during which 12 consecutive attempts are made to recover the header information from the read header 170. For reference, on one particular type of disc drive it was found that over 90% of write header errors were corrected on the first attempt at recovering the header information from the alternate read header, and that most of the remaining errors were successfully resolved on the second attempt. Hence, 12 attempts was selected as an advantageous number of attempts to enable resolution of substantially all such errors on all nominally identical drives. Again, the particular number of attempts will vary depending upon the requirements of each application.

Table II. further shows that the head 118 is positioned at 100% of the read-write offset (i.e., with the read element 176 substantially centered on the write header 172, as shown in FIG. 12) and that ECC is disabled as the read element 176 attempts to retrieve the header information from the read header 170. Of course, as the routine of FIG. 14 is a write operation, ECC decoding is not applicable; however, if the routine is successful, the data written to the data field 164 will still be encoded with ECC code symbols in a conventional manner.

Accordingly, in view of the foregoing discussion it will be understood that the present invention is directed to an apparatus and method for recovering from a header error condition in a disc drive (such as 100) of the type having a rotatable disc (such as 108) on which a plurality of nominally concentric tracks (such as 160) are defined, with each of the tracks including data fields (such as 164) for the storage and retrieval of data and header fields (such as 166) providing logical address information for the data fields. The header fields include read and write headers (such as 170, 172) which are used during read and write operations, respectively, to align read and write elements (such as 174, 176) of a head (such as 118) with the data fields.

When the disc drive unsuccessfully decodes the logical address information from a selected header associated with a selected data block, an error recovery routine is performed wherein attempts are made to decode the logical address information from the alternate header associated with the selected data block (such as at 202, 210, 232). Radial offsets can further be applied (such as at 208, 214) to the head to enhance the decoding of the logical address information from the alternate header. The selected data block can further be deallocated from future use (such as at 213).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a controllably positionable head adjacent a rotatable disc on which a plurality of tracks are defined, the head having separate read and write elements which are physically offset within the head, wherein access operations comprising read and write operations are performed upon data fields of the tracks to retrieve and store user data, respectively, wherein pairs of adjacent first and second header fields independently identify logical addresses for the data fields with a selected one of the first and second header fields used during read operations and a remaining one of the first and second header fields used during write operations, the first and second header fields radially offset on the disc in relation to the physical offset between the read and write elements, a method for performing a selected access operation upon a selected data field after a failure to identify the logical address of the data field from the selected one of the first and second header fields associated with the selected access operation, comprising a step of:

(a) identifying the logical address of the data field from the remaining one of the first and second header fields.

2. The method of claim 1, wherein the identifying step (a) further comprises reading the remaining one of the first and second header fields over a plurality of rotations of the disc.

3. The method of claim 1, wherein the selected access operation is a read operation, the remaining one of the first and second header fields is a write header field, and wherein the identifying step (a) further comprises applying a radial offset to the head to move the head in a direction toward the write header field.

4. A method for recovering from a header error condition in a disc drive of the type having a rotatable disc and a controllably positionable head adjacent the disc, the head having separate read and write elements which are physically offset within the head, the disc having a plurality of data tracks with data fields used for the storage and retrieval of data by the head, each data field having a pair of adjacent header fields comprising an associated read header field and a separate, associated write header field used during read and write operations, respectively, the read header field and the write header field each independently storing a logical address for the data field and disposed at different radial locations on the disc in relation to the physical offset of the read and write elements, the method comprising steps of:

(a) reading the write header field associated with a selected data field when an anomalous condition prevents identification of the logical address of the data field from the read header field during a read operation; and (b) reading the read header field associated with the selected data field when an anomalous condition prevents the identification of the logical address of the data field from the write header field during a write operation.

5. The method of claim 4, wherein step (a) is further characterized by:

(i) applying a radial offset to the head to move the head in a direction toward the write header field.

6. The method of claim 4, further characterized by:

(c) deallocating the selected data field at the conclusion of the operation of step (a) or step (b).

7. In a disc drive of the type having a controllably positionable head adjacent a rotatable disc on which a plurality of tracks are defined, the head having separate read and write elements which are physically offset within the head, each track having a plurality of data fields in which user data are stored and a plurality of pairs of associated header fields which provide logical addresses for the data fields, the header fields including read header fields which are accessed by the head during read operations and write header fields which are accessed by the head during write operations, the read and write header fields respectively, radially offset on the disc in relation to the physical offset between the read and write elements, a method for performing a read operation upon a selected data field after the head fails to determine the logical address of the data field from the associated read header field, comprising steps of:

(a) accessing the write header field associated with the data field to determine the logical address of the data field.

8. The method of claim 7, wherein the radial locations of the read and write headers are selected to cause the read element to be nominally centered over the data field during a read operation and the write element to be nominally centered over the data field during a write operation, and wherein step (a) further comprises a step of:

(i) applying a radial offset to the head to move the head in a direction toward the write header field.

9. The method of claim 7, further comprising a step of:

(b) deallocating the data field at the conclusion of step (a).

10. In a disc drive of the type having a controllably positionable head adjacent a rotatable disc on which a plurality of tracks are defined, the head having separate read and write elements which are physically offset within the head, each track having a plurality of data fields in which user data are stored and a plurality of pairs of associated header fields which provide logical addresses for the data fields, the header fields including read header fields which are accessed by the head during read operations and write header fields which are accessed by the head during write operations, the read and write header fields respectively, radially offset on the disc in relation to the physical offset between the read and write elements, a method for performing a write operation upon a selected data field after the head fails to determine the logical address of the data field from the associated read header field, comprising steps of:

(a) accessing the read header field associated with the data field to determine the logical address of the data field.

11. The method of claim 10, further comprising a step of:

(b) deallocating the data field at the conclusion of step (a).

12. A disc drive, comprising:

a head which stores data to and retrieves data from data fields defined on tracks on a surface of a rotatable disc, the head comprising a write element and a read element which are physically separated by a selected offset;

a servo circuit which positions the read element adjacent read and write header fields on the tracks during read and write operations, respectively, the read and write header fields each providing a logical address for an associated data field during read and write operations, respectively, and radially offset on the disc in relation to the offset between the read and write elements of the head; and a read/write channel, operably connected to the head, which decodes the logical addresses from the read and write header fields and the data from the associated data fields, wherein during a read header error recovery routine the read/write channel decodes the logical address of a selected data field from the associated write header field after unsuccessfully decoding the logical address of the selected data field from the associated read header field during a read operation.

13. The disc drive of claim 12, wherein during a write header error recovery routine the read/write channel further decodes the logical address of a selected data field from the associated read header field after unsuccessfully decoding the logical address of the selected data field from the associated write header field during a write operation.

14. The disc drive of claim 12, wherein the servo circuit applies a radial offset to move the head in a direction toward the associated write header field.

15. The disc drive of claim 12, wherein the selected data field is subsequently deallocated from future use.

* * * * *